No. 696,433. Patented Apr. 1, 1902.
J. HEDDON.
FISH BAIT.
(Application filed Jan. 9, 1902.)
(No Model.)

Witnesses:
A. E. Houghton
Otto A. Earl

Inventor,
James Heddon
By Fred L. Chappell
Atty.

UNITED STATES PATENT OFFICE.

JAMES HEDDON, OF DOWAGIAC, MICHIGAN.

FISH-BAIT.

SPECIFICATION forming part of Letters Patent No. 696,433, dated April 1, 1902.

Application filed January 9, 1902. Serial No. 88,951. (No model.)

*To all whom it may concern:*

Be it known that I, JAMES HEDDON, a citizen of the United States, residing at the city of Dowagiac, in the county of Cass and State of Michigan, have invented certain new and useful Improvements in Fish-Baits, of which the following is a specification.

This invention relates to improvements in fish-baits.

The objects of the invention are to provide an improved casting or trolling bait which shall be conspicuous, and which shall be effective in presenting the hooks to the best advantage for catching the fish, and which is provided with means for keeping the same one side up, and which is provided with means for producing conspicuous agitation of the water, and which in view of the number of hooks which it carries is quite effective in avoiding weeds.

A further object is to provide means whereby the hooks may be readily attached and detached.

Further minor objects will definitely appear from the detailed description to follow.

I accomplish the objects of my invention by the devices and means described in this specication.

The invention is clearly defined and pointed out in the claims.

A structure fully embodying the features of my invention is fully illustrated in the accompanying drawings, forming a part of this specification, in which—

Figure 1:
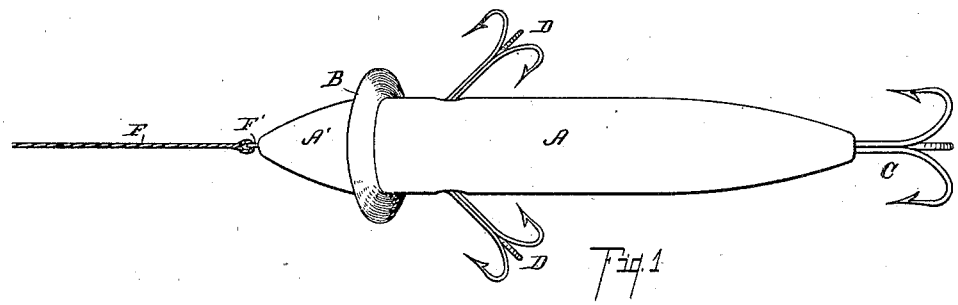
Figure 2:
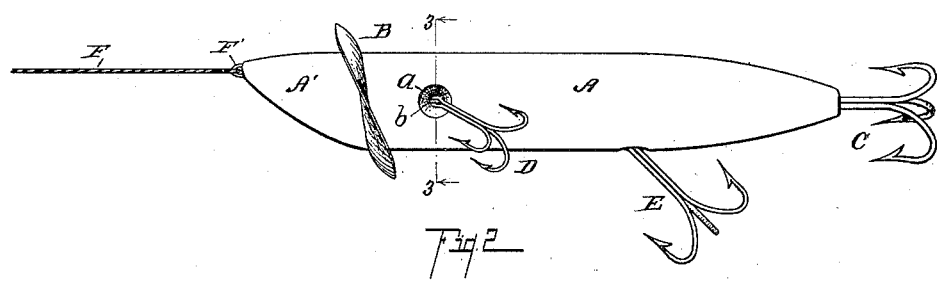
Figure 3:
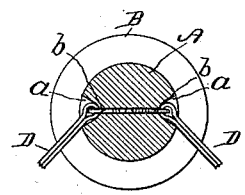
Figure 4:

Figure 1 is a plan view of my improved casting-bait. Fig. 2 is a side elevation of the same. Fig. 3 is a transverse sectional view on line 3 3 of Fig. 2. Fig. 4 is an enlarged perspective view of the screw-eye b, used to detachably secure the hook D to the body portion A.

In the drawings all of the sectional views are taken looking in the direction of the little arrows at the ends of the section-lines, and similar letters of reference refer to similar parts throughout the several views.

Referring to the lettered parts of the drawings, A is the main body of the bait, which is preferably made of wood and preferably painted pure white.

A' is the head end, which is preferably of such color as to be inconspicuous in the water, as a sky-blue or green, which tends to direct the strike of the fish toward the body of the bait, containing the hooks. The head end is pointed forwardly, its extreme point being above the center portion of the body of the bait, and the pointed end is provided with a screw-eye F' for the attachment of the line F. This elevated point, to which the line is attached, tends to keep the bait one side up when being drawn upon the surface of the water.

A collar B is placed upon the bait, forming a line of demarcation between what I term the "head" and the body. The upper portion of the collar B projects forward and the lower portion backward, so that when the bait is being drawn upon the surface of the water it will run high upon the surface, draw easily, and if when thrown the bait should strike upon its back or side the collar B tends to revolve the bait to its proper position. Further, the upper forward projection and lower backward projection of the collar B when running upon the water produces a peculiar agitation, throwing into the air jets or streams of water, which will glisten in the sunlight, which creates an additional attraction for the fish.

On the sides of the body portion A, I place a pair of three-pronged hooks D, and on the bottom I place a three-pronged hook E. The eyes of these hooks are held near the bottom of little sockets *a* and are there retained by screw-eyes, which have the eye open sufficiently to receive the rings forming the eye of the hooks. When the screw-eyes are turned down tightly, the hooks are held securely in place. When the screw-eyes are turned up two or three rounds, the hooks are detachable. This is a great convenience to fishermen using this bait, as it enables them to replace broken hooks with new ones or to change sizes of hooks, as may be desirable. The eyes of the hooks being held well down toward the bottom of the sockets prevents the prongs of the hooks from lying close to the sides of the bait and holds them out, so that in the event of the fish striking at the bait the prongs of the hooks are in the best possible position to make a sure catch. At the rear end I place a three-pronged hook C, held rigidly in place, as I find it is more effective in that form, saving many fish by hooking them on the outside as they detach themselves from the side hooks, as they sometimes do while being drawn toward the angler.

It will be observed from this description that I provide a bait which always remains right side up, which produces great agitation of the water, and runs easily when drawn upon its surface. That the hooks are arranged and supported in the best possible position for catching the fish.

When it is desired to make this bait what is termed a "weedless" bait, the under hook E is removed and the lower prong of the rear hook C is removed, when it will be found that the remaining hooks are held in such position that the bait will readily pass over weeds and sticks.

Having thus described my invention, what I claim as new, and desire to secure by Letters Patent, is—

1. In a fish-bait, the combination of a body; a head portion the point of which is above the center of the body portion; a collar between said head and body portion, the upper portion of which projects forwardly and the lower portion of which projects rearwardly, for the purpose specified.

2. In a fish-bait, the combination of a body; a head portion the point of which is above the center of the body portion whereby spinning is prevented and the bait held right side up; a collar between said head and body portion, for the purpose specified.

3. In a fish-bait, the combination of a body portion; a collar thereon, the upper portion of which projects forwardly, and the lower portion of which projects backwardly, for the purpose specified.

4. In a fish-bait, the combination of a body; having sockets therein; hooks the eyes of which are secured at the bottom of said sockets, for the purpose specified, whereby the hooks are supported to project outwardly from said body.

5. In a fish-bait, the combination of the body portion; hooks detachably secured to said body portion by a screw-eye, the eye of which is open at the outer end of the shank, for the purpose specified.

In witness whereof I have hereunto set my hand and seal in the presence of two witnesses.

JAMES HEDDON. [L. S.]

Witnesses:
DANIEL RUMMEL,
ALEX. BUSHMAN.